(12) United States Patent
Bajo et al.

(10) Patent No.: US 11,795,092 B2
(45) Date of Patent: Oct. 24, 2023

(54) PLUNGER ASSEMBLY FOR FORMING RIBBONS OF MOLTEN GLASS

(71) Applicants: BOTTERO S.P.A., Cuneo (IT); REVIMAC S.R.L., Cuneo (IT)

(72) Inventors: Rolando Bajo, Cuneo (IT); Giovanni Meneghetti, Cuneo (IT); Bruno Nittardi, Cuneo (IT); Giulio Pretto, Cuneo (IT)

(73) Assignees: BOTTERO S.P.A., Cuneo (IT); REVIMAC S.R.L., Cuneo (IT)

( * ) Notice: Subject to any disclaimer, the term of this patent is extended or adjusted under 35 U.S.C. 154(b) by 281 days.

(21) Appl. No.: 17/286,622

(22) PCT Filed: Oct. 18, 2019

(86) PCT No.: PCT/IB2019/058913
§ 371 (c)(1),
(2) Date: Apr. 19, 2021

(87) PCT Pub. No.: WO2020/079663
PCT Pub. Date: Apr. 23, 2020

(65) Prior Publication Data
US 2021/0387888 A1    Dec. 16, 2021

(30) Foreign Application Priority Data
Oct. 19, 2018  (IT) .................. 102018000009629

(51) Int. Cl.
*C03B 7/086*    (2006.01)
*C03B 7/00*     (2006.01)
*C03B 7/094*    (2006.01)

(52) U.S. Cl.
CPC .............. *C03B 7/086* (2013.01); *C03B 7/005* (2013.01); *C03B 7/094* (2013.01)

(58) Field of Classification Search
CPC .............................. C03B 7/086; C03B 7/005
See application file for complete search history.

(56) References Cited

U.S. PATENT DOCUMENTS

| 4,551,163 A | * | 11/1985 | Duga | ...................... C03B 7/086 65/129 |
| 5,660,610 A | * | 8/1997 | DiFrank | .................. C03B 7/086 65/158 |
| 5,885,317 A | | 3/1999 | Leidy et al. | |

FOREIGN PATENT DOCUMENTS

| CN | 102460765 A | 5/2012 |
| CN | 103400941 A | 11/2013 |

(Continued)

OTHER PUBLICATIONS

Chinese Office Action dated Oct. 13, 2022 from corresponding Chinese Patent Application No. 201980068561.6, 13 pages.

(Continued)

*Primary Examiner* — Erin Snelting
(74) *Attorney, Agent, or Firm* — Ruggiero McAllister & McMahon LLC

(57) ABSTRACT

In a plunger assembly for forming ribbons of molten glass, at least one extruder plunger is guided in a vertical direction from and towards a tank adapted to contain a mass of molten glass from a guide head carried by a support arm kept fixed during the forming of the bead. The extruder plunger is displaced by alternated cyclic motion with respect to the support arm according a predefined law of motion from one drive unit displaced above the support arm and at least partly above the tank.

15 Claims, 4 Drawing Sheets

(56) References Cited

FOREIGN PATENT DOCUMENTS

| | | |
|---|---|---|
| CN | 103843165 A | 6/2014 |
| CN | 203947019 U | 11/2014 |
| CN | 206219422 U | 6/2017 |
| IT | 1182522 B | 10/1987 |
| WO | 2016/208596 A | 12/2016 |
| WO | 2017/010847 A2 | 1/2017 |

OTHER PUBLICATIONS

International Search Report dated Jan. 23, 2020 for PCT application No. PCT/IB2019/058913.
Written Opinion dated Jan. 23, 2020 for PCT application No. PCT/IB2019/058913.

* cited by examiner

PLUNGER ASSEMBLY FOR FORMING RIBBONS OF MOLTEN GLASS

CROSS-REFERENCE TO RELATED APPLICATIONS

This application is a national stage application, filed under 35 U.S.C. § 371, of International Patent Application No. PCT/162019/058913, filed on October 19, 2019 which claims priority to Italian patent application no. 102018000009629 filed on Oct. 19, 2018, the entire content of each of which is incorporated herein by reference.

BACKGROUND OF THE DISCLOSURE

1. Field of the Disclosure

The present disclosure relates to a plunger assembly for forming ribbons of molten glass.

2. Description of Related Art

In the field of forming hollow glass articles it is known to use forming machines, commonly known as IS machines, which comprise a plunger assembly for forming one or more ribbon of molten glass and a cutting assembly for transversely and mechanically cutting each of the ribbons and producing a succession of glass drops. The drops thus formed are then deposited and processed inside moulds for forming articles.

The plunger assembly comprises a molten glass container with one or more bottom openings and, for each of the openings, a corresponding vertical extruder plunger for extruding the glass through its corresponding opening.

A single extruder plunger is generally used when producing one drop per cycle, or two to four extruder plungers to produce multiple drops simultaneously.

As is known from the patent IT 1.182.522, the extruder plungers are supported by an end portion of a common handling arm, one opposite end portion of which is coupled to a vertically sliding slide. The displacement of the slide and, therefore, of the arm and of the plungers, is controlled by a motorized cam group adapted to displace the arm and, therefore, the extruder plungers with a predefined motion profile. Such a production method does not allow the various plungers to be displaced with different laws of motion and, therefore, to simultaneously form different ribbons and then different drops of glass.

The above problem is solved by interposing an additional motorized adjustment device, which is independent of the other additional devices, between each extruder plunger and the common arm. These additional devices significantly increase the mass transported in a cantilever fashion by the common arm and make it difficult to operate and control the weight of the drop. The above is a consequence of the fact that the increase in the translating mass inevitably entails an increase in the response times resulting from the high inertia that opposes the extruder plungers' continuous inversion of motion. In addition to this, the adjustment of each extruder plunger's law of motion is the result of two separate and independent adjustments and, therefore, often a sum of errors.

The above problems are partly solved by the forming group described in the U.S. Pat. No. 5,885,317. In this forming assembly, each extruder plunger is coupled to a free end of its own arm, the opposite end of which is connected to a corresponding linear actuator independent of the other linear actuators.

However, this solution is mechanically complex, expensive, and, above all, very cumbersome.

The solutions described above all have, for each of the extruder plungers, a very long kinematic displacement chain with extended cantilevered arms, for which it is always necessary to find a compromise between a strong stiffening and a high weight and a minimum deformation. Whatever choice is made, is made at the expense of the vertical positioning accuracy of the extruder plunger with respect to the bottom openings.

In addition to this, the support arms are very long, cantilevered arms and, as such, subject to high bending torques. It follows that it is extremely difficult to accurately control the weight variation of the drops formed, which, for light articles, are in the order of more or less 0.5% of the weight of the article formed and, therefore, a few tenths of a gram.

SUMMARY OF THE DISCLOSURE

The purpose of this disclosure is to provide a plunger assembly for forming ribbons of molten glass, which allows the above problems to be solved in a simple and economical way and, in particular, a plunger assembly, in which the plungers can be operated independently and according to predefined laws of motion.

BRIEF DESCRIPTION OF THE DRAWINGS

The disclosure will now be described with reference to the accompanying drawings, which illustrate a non-limiting embodiment thereof, wherein.

DETAILED DESCRIPTION OF THE DISCLOSURE

Figure 1:
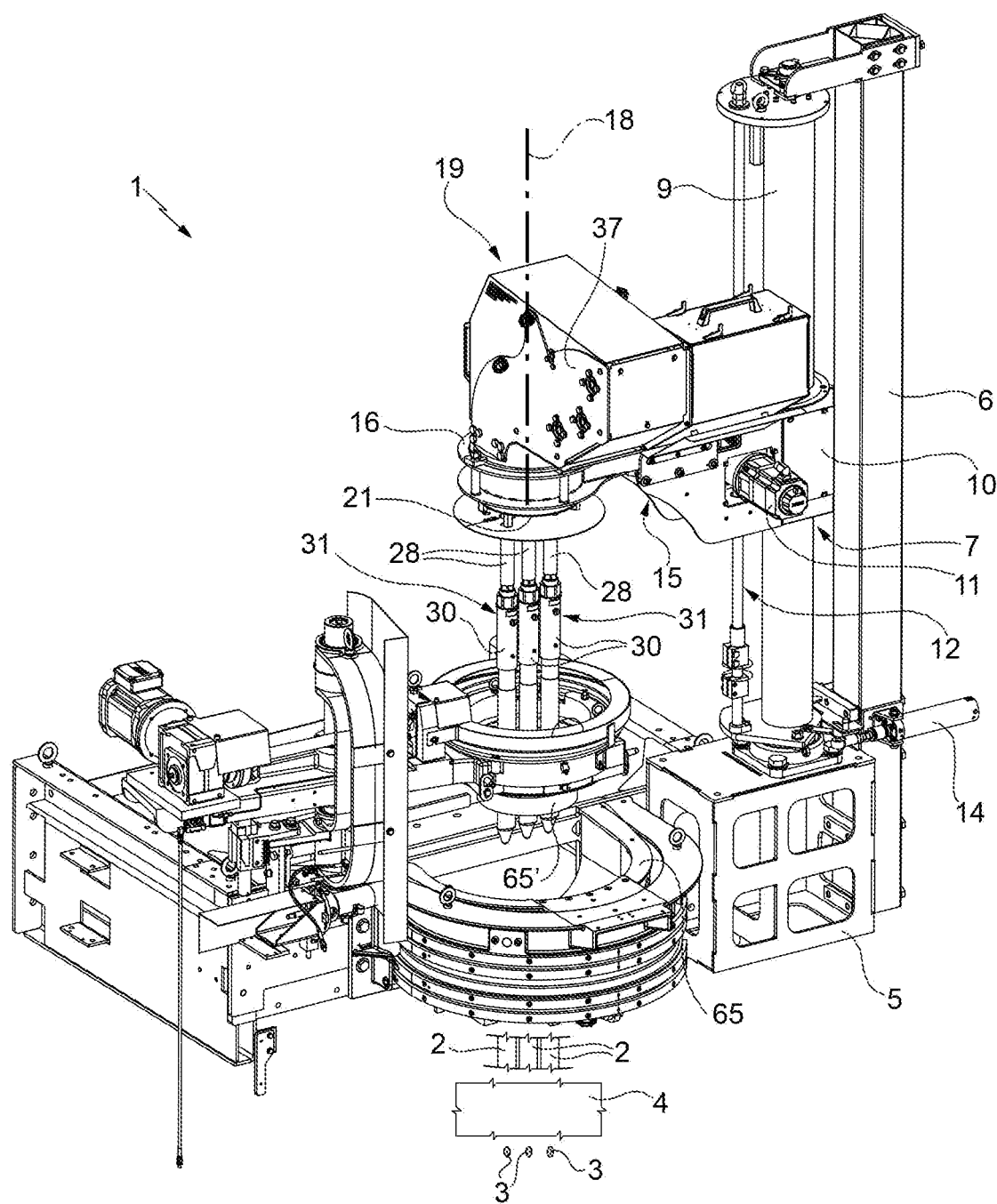
FIG. 1 is a perspective view with parts removed for the sake of clarity of a preferred embodiment of a plunger assembly produced according to the dictates of this disclosure.

In FIG. 1, the number 1 designates, as a whole, a forming assembly for ribbons of molten glass. In the example described, the assembly 1 is configured to simultaneously form three ribbons 2 of molten glass that are equal or not and that are adapted to being transversely cut to produce a succession of drops 3 of glass by means of a cutting device 4, known and schematically shown.

The assembly 1 comprises a bed 5, a pillar 6 extending upwards from the bed 5, and a guide-slide set 7 extending upwards from the bed 5 and coupled to the pillar 6. The guide-slide set 7 comprises a cylindrical guide 9 and a slide 10 that is coupled to the guide 9 in a sliding way in opposite directions and in an angularly fixed position. The position of the slide 10 along the guide 9 is adjustable by means of a motor 11 that drives a screw drive transmission 12. Once positioned, the slide is kept fixed for the whole process of forming the ribbons 2. The guide-slide set 12, the motor 11 and the transmission 12 can rotate around the axis 13 of the cylindrical guide 9 under the thrust of an actuator 14 between an operating or working position, shown in FIG. 1, and a rest position, which is adapted to enable the necessary maintenance operations.

The slide 10 has an end portion of a horizontal support arm 15 integrally connected, an opposite end portion 16 of which is annular in shape and extends coaxially to a vertical axis 18.

The end portion 16 of the arm 15 is coupled to a forming unit 19 that can be extracted or removed from above.

Figure 2:
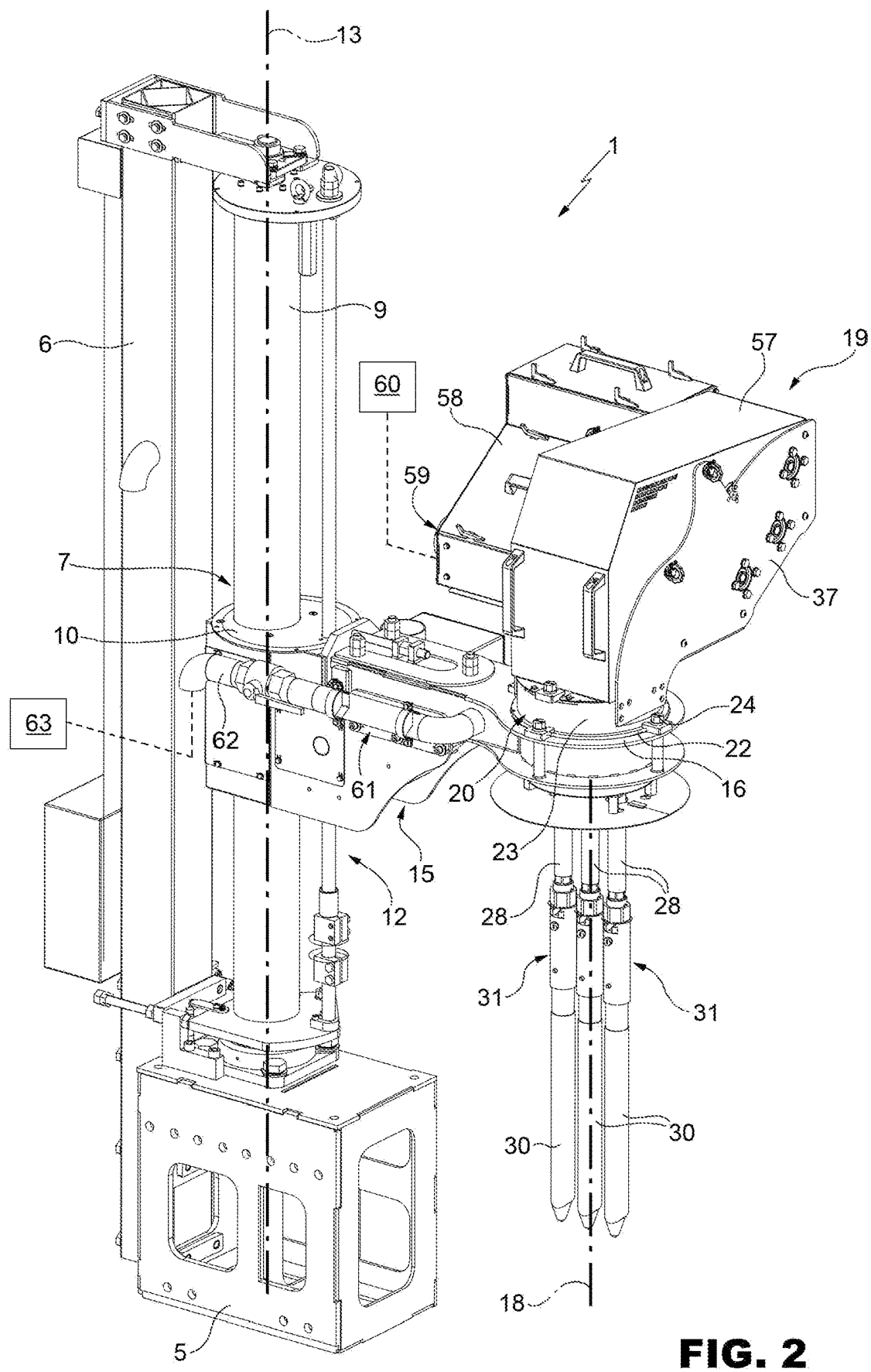
FIG. 2 is a different perspective view of the plunger assembly in FIG. 1 with parts removed for clarity.
Figure 3:
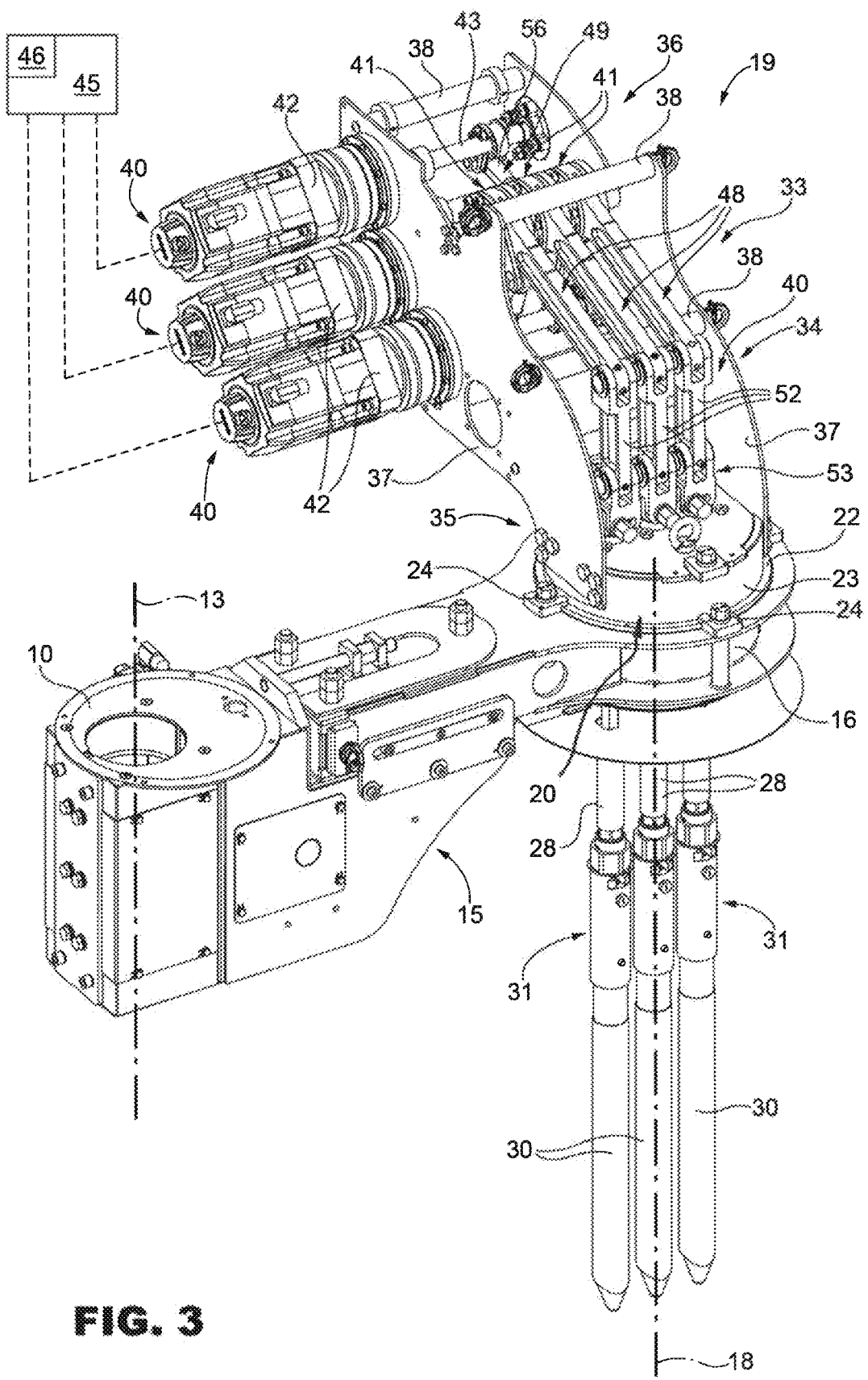
FIG. 3 is an enlarged perspective view of a detail of FIGS. 1 and 2 with additional parts removed for clarity.

With reference to FIGS. 1 to 3, the forming unit 19 comprises a cylindrical attachment and guide head 20, which extends coaxially to the axis 18 and comprises a lower cylindrical portion 21 that is inserted by means of a sliding coupling in the annular end portion 16, an intermediate outer flange 22 positioned above and against the annular portion 16, and an upper cylindrical portion 23. In this way, the head 20 is supported by the arm 15 and coupled to the arm 15 itself in a rotating manner inside the portion 16 around the axis 18. The head 20 is releasably locked to the portion 16 by means of a plurality of screws 24 that tighten the flange 22 against the same portion 16.

Figure 4:
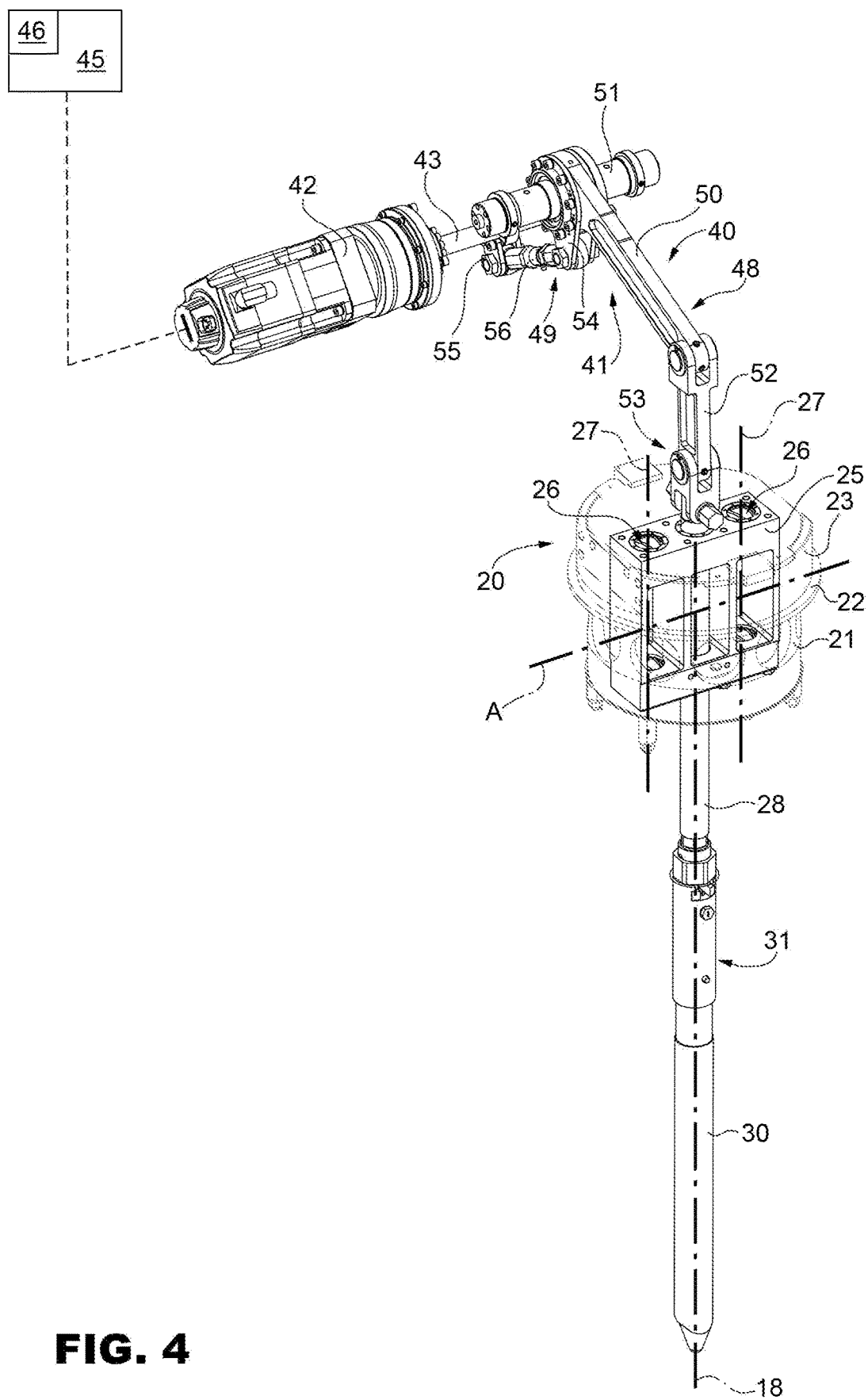
FIG. 4 shows a detail of FIG. 3 in perspective view with additional parts removed for clarity.

The head 20 houses, locked in a fixed position, a multiple guide 25, shown in detail in FIG. 4. The multiple guide 25 has, in this case, three guide through holes 26 with respective axes 27 that are parallel to each other and to the axis 18 and aligned in one direction A.

Each hole 26 is engaged in a sliding way by a corresponding through rod 28, which has a lower end portion firmly connected to an upper end portion of an extruder plunger 30, known in itself, and, conveniently, produced in ceramic material.

Each rod 28 and its corresponding extruder plunger 30 are aligned with each other and coaxial to a common axis coinciding with the axis 27 of the respective guide hole 26. Each extruder plunger 30 is conveniently connected to its corresponding rod 28 via a quick coupling device 31. Irrespective of the connection mode, the extruder plungers 30 are arranged side-by-side in the A direction.

Again with reference to FIG. 1 and, in particular, to FIG. 4, the unit 19 also comprises an assembly 33 for handling the extruder plungers 30, carried by the arm 15 and configured to displace each extruder plunger 30 along the corresponding axis 27 of alternated cyclic motion and irrespective of the other extruder plungers 30.

With reference to FIG. 3, the assembly 33 comprises a boxed support structure 34 carried by the arm 15 and extending above the arm 15 itself. The structure 34 comprises a lower attachment portion 35 that is firmly connected by means of screws to the upper cylindrical portion 23 of the head 20, and an upper support portion 36. Portion 36 protrudes upwards and laterally in a cantilever fashion from the lower portion 34 in a transverse direction to the arm 15.

With reference to FIGS. 3 and 4, the boxed structure 34 conveniently comprises two plates 37 positioned so that they face each other and spaced apart in a direction orthogonal to the axes 18 and 27. The plates 37 are firmly connected to each other by means of a plurality of spokes 38, as shown in FIG. 3.

Again with reference to FIG. 3, the drive assembly 33 comprises, for each extruder plunger 30, a respective motorized displacement device 40, which is independent of the displacement devices 40 of the other extruder plungers 30.

The displacement devices 40, are, conveniently, identical to each other. Each displacement device 40 comprises a corresponding mechanical lever transmission 41 driven by a corresponding gear motor 42. Each gear motor protrudes in a cantilever fashion beyond one of the plates 37 and has a corresponding output shaft 43 extending between the plates 37 orthogonally to the axes 18 and 27 and spaced apart from the other output shafts 43 at such a distance that the gear motors 42 are placed close to each other, as shown in FIG. 3.

The gear motors 42 are controlled by a command and control unit 45 known in itself, which is configured to rotate the gear motors 42 of alternated cyclic motion and displace them according to laws of motion. These are known as electronic cams and are equal to each other or not, are stored in a memory block 46, and can be chosen according to the geometric characteristics and/or weight of the drops 3 to be produced. In particular, each mechanical transmission 41 comprises a kinematic connecting rod-crank 48 and a kinematic quadrilateral joint 49 positioned in cascade to each other, as clearly shown in FIG. 4.

With reference to FIG. 3 and, in particular, to FIG. 4, each kinematic connecting rod-crank 48 comprises a connecting rod 50 having a connecting rod foot coupled to a fixed hinge shaft 51 orthogonal to the axes 18 and 27 and parallel to the output shafts 43 and common to all kinematic connecting rod-cranks 48. The connecting rod foot is coupled to an intermediate section of the shaft 51 in a rotating manner and in an axially fixed position. Each crank 50 then has a connecting rod head hinged to a corresponding connecting rod 52 coupled, in turn, to the upper portion of its corresponding rod 28 by means of a crossed joint 53.

With reference to FIG. 4, each connecting rod foot has a crank 54 (FIG. 4) integrally connected and inclined with respect to a rod of the corresponding connecting rod 50 and forming part of the respective kinematic quadrilateral joint 49. In addition to the crank 54, each kinematic quadrilateral joint 49 comprises an additional crank 55 fitted to the output shaft 43 of the corresponding gear motor 42, and a corresponding connecting bar 56 for the crank heads 54 and 55.

Again with reference to FIGS. 1 and 2, the boxed structure 34 then comprises a crankcase or boxed casing 57, which is coupled to the plates 37 in a removable way to define an inspectable housing chamber for the transmissions 41.

The boxed structure 34 then comprises an additional crankcase or boxed casing 58, which extends to the side of the plate 37 facing the cylindrical guide 9 and delimits a gear motor housing chamber 42 communicating with the transmission chamber 41. The gear motor housing chamber 42 has an inlet opening 59 connected to a cooling air supply device 60 for the gear motors 42.

The plunger assembly also comprises an additional air cooling device 61 for the head 20. The device 61 comprises a pipe 62 connected to a blower unit 63, on one side, and flowing into the arm 15 near the annular portion 16, on the other side. The cooling devices 60 and 61 are distinct and independent.

The assembly 1 comprises, finally, a containment tank 65 of molten glass, known in itself and comprising a back wall equipped, for each extruder plunger 30, with a through outlet opening for the ribbon 2 of molten glass.

The assembly 1 also comprises a rotating tube mechanism 65', also known in itself, which surrounds the extruder plungers 30.

In use, the slide 10 is brought to a predefined height, which is chosen according to the type of tank 63 and the height of the extruder plungers 30 used, via the motor 11, and is kept fixed in this position for the entire time the ribbons 2 are being formed. With the slide 10 in a fixed position, the command and control unit 45 controls the gear motors 42 in such a way as to translate each extruder plunger 30 along the corresponding axis 27 of alternated cyclic motion, and according to the law of motion stored in the memory block 46 of the unit 45, so that each extruder plunger 30 forms a corresponding ribbon 2 of molten glass, which is then cut by the cutting assembly 4 to form drops 3 of glass.

From the above, it is clear that the use of an extruder plunger drive unit 30 positioned above a fixed arm and in a position close to the translation axes 27 of the extruder plungers 30, i.e. directly above the tank 63, allows, first of all, to produce ribbon-forming assemblies of particularly small dimensions. In addition to this, the particular positioning, allows there to be extremely small transmissions and, consequently, small masses in relative motion, low inertia, and a better dynamic behaviour of the plunger assembly 1.

In addition to this, each extruder plunger 30 is coupled to a corresponding rod 28 which is vertically guided by a fixed guide, so any transverse actions transferred to the same rod 28 are never transmitted to the corresponding extruder plunger 30.

Since each gear motor 42 is independently controlled by the other gear motors 42, it is possible: to perform and control the law of motion of each extruder plunger 30 and, ultimately, the formed drop; and, via the feedback of a drop weight control system, for example, to perform the drop weight corrections in real time owing both to an overall drift of all the drops of a cutting cycle and to the drift of the single drop with respect to the others.

In addition to this, by controlling each electronic cam of each extruder plunger 30, it is possible to change in real time the starting position and the plunger stroke for each ribbon cutting cycle. It is therefore possible to directly perform fine adjustments to the weight of the single drop 3 via control of the plunger cam and no longer via external devices, which interact with the movement controlled by the plunger device, as in the known solutions.

If the weight variation is an overall drift of all the drops, each plunger axis control will intervene equally to correct the starting position of the cam and, if need be, its stroke.

If only one drop has a weight that deviates from the nominal value, the axis control of the relevant extruder plunger will intervene, bringing the weight back within the set-up value, while the other extruder plungers will continue to operate with the set parameters.

An additional advantage is the possibility of operating each single extruder plunger 30 with a cam other than the one used for the other extruder plungers. This solves some problems of drops with inconsistent shapes produced in the same cutting cycle.

This last aspect is particularly useful in the case of multiple weight productions, where different sections of the machine have to produce articles of different weights. The possibility of easily controlling the shape and weight of the drop within the same cutting cycle, instils the system with greater flexibility and excellent compensation for any differences between the different drops produced.

Furthermore, the fact that the whole drive mechanism of the extruder plungers can be extracted, simply by lifting the entire unit 19 with respect to the arm 15, i.e. by decoupling the coupling head 20 and guide from the arm 15, greatly simplifies the replacement of the same unit 19, without needing to dismantle components and simply removing the extruder plungers by releasing the quick connecting devices 31.

The fact, instead, of coupling the unit 19 to the arm 15 in a rotating manner around a vertical axis, in this case axis 18, allows to rotate the alignment direction A of the extruder plungers 30, and therefore of the corresponding ribbons 2 around the axis 18, and to bring the alignment direction A to a position that is always parallel to the corresponding alignment direction of the underlying cutting assembly 4 and that, as known, varies from one cutting group to another. In this way, the assembly 1 becomes adaptable to any cutting assembly.

Finally, the provision of two different cooling devices, one for the gear motors 42 and one for the coupling and guide head 20, allows the operating temperature to be kept under control, according to the type of cooled component, considering the high temperature resulting from the fact that these components are positioned above a mass of molten glass.

Finally, it is clear from the preceding that the assembly 1 described may be subject to modifications and variations without thereby departing from the protective scope defined in the independent claim. For example, the assembly 1 may comprise a different number of extruder plungers than the one described, for example a single extruder plunger or a pair of extruder plungers. In addition, in the assembly 1, the extruder plungers could be controlled by transmissions other than those described but always positioned above the arm 15. Depending on the application, the same transmissions could only comprise the kinematic connecting rod-crank. In the same way, the transmissions may be driven by gear motors other than those indicated and, for example, by linear motors. Not only that, but the transmissions could be missing and the linear motors or linear actuators, in general, could be directly connected to the rods 28.

The invention claimed is:

1. A plunger assembly for forming drops of molten glass, the plunger assembly comprising:
   a fixed frame;
   a tank adapted to accommodate a mass of molten glass;
   a support arm that is cantilevered and extends from the fixed frame and above the tank;
   at least a first extruder plunger adapted to be inserted in the tank for forming a ribbon of molten glass and having a vertical axis;
   a first motorised handling means for cyclically moving the first extruder plunger and forming the ribbon of molten glass; and
   an electronic control unit for the first motorised handling means and configured to move the first extruder plunger from and towards the tank with an alternated cyclic motion along the vertical axis and by an electronic cam,
   wherein the support arm is fixed with respect to the fixed frame during a cyclic displacement of the first extruder plunger,
   wherein the first motorised handling means translates the first extruder plunger with respect to the support arm,
   wherein the support arm has an attachment structure for the first motorised handling means, the attachment structure supported by the support arm, and
   wherein the support arm has a guide head coupled to the support arm that guides the first extruder plunger in a vertical direction parallel to the vertical axis during the cyclic displacement.

2. The plunger assembly according to claim 1, wherein the first motorised handling means extends above the support arm.

3. The plunger assembly according to claim 1, wherein in that the first motorised handling means extends at least in part at the tank.

4. The plunger assembly according to claim 1, further comprising a first drive means that comprises a first drive motor carried by the attachment structure.

5. The plunger assembly according to claim 4, wherein the first drive motor is a rotating motor or a linear motor.

6. The plunger assembly according to claim 4, wherein the first drive means further comprises a first transmission interposed between the first drive motor and the first extruder plunger, and, wherein the first transmission is carried by the attachment structure.

7. The plunger assembly according to claim 6, wherein the first transmission is a mechanical lever transmission.

8. The plunger assembly according to claim 7, wherein the first transmission comprises a kinematic quadrilateral joint and a kinematic connecting rod-crank.

9. The plunger assembly according to claim 4, further comprising a first air cooling device for the first drive motor, wherein the first air cooling device is carried, at least in part, by the support arm.

10. The plunger assembly according to claim 9, further comprising a second air cooling device for the guide head.

11. The plunger assembly according to claim 10, wherein the first and second cooling devices are separate and independent from each other.

12. The plunger assembly according to claim 1, wherein the attachment structure is firmly connected to the guide head.

13. The plunger assembly according to claim 12, wherein the guide head is coupled to a free end portion of the support arm in a rotating manner around a vertical axis and in a vertically fixed position, and the plunger assembly further comprises an angular locking means provided for locking the guide head onto the support arm in a plurality of angular positions.

14. The plunger assembly according to claim 1, further comprising at least a second extruder plunger parallel to the first extruder plunger and a second motorised handling means controlled by the electronic control unit for displacing the second extruder plunger with an alternated cyclic motion along a vertical axis of the second extruder plunger with respect to the support arm, wherein the first and second motorised handling means are independent from each other for displacing the second extruder plunger independently from the first extruder plunger.

15. The plunger assembly according to claim 1, wherein the attachment structure, the first motorised handling means and the guide head form parts of a unit that can be vertically uncoupled from the support arm.

\* \* \* \* \*